(12) United States Patent
Gutman (10) Patent No.: US 11,102,549 B2
(45) Date of Patent: Aug. 24, 2021

(54) SELECTIVE VIDEO OVERLAY

(71) Applicant: WURL INC., Palo Alto, CA (US)

(72) Inventor: Ron Gutman, San Diego, CA (US)

(73) Assignee: WURL INC., Palo Alto, CA (US)

( * ) Notice: Subject to any disclaimer, the term of this patent is extended or adjusted under 35 U.S.C. 154(b) by 328 days.

(21) Appl. No.: 16/139,041

(22) Filed: Sep. 23, 2018

(65) Prior Publication Data

US 2019/0098362 A1  Mar. 28, 2019

Related U.S. Application Data

(60) Provisional application No. 62/563,932, filed on Sep. 27, 2017.

(51) Int. Cl.

| | |
|---|---|
| *H04N 21/4722* | (2011.01) |
| *H04N 21/458* | (2011.01) |
| *H04N 21/44* | (2011.01) |
| *H04N 19/51* | (2014.01) |
| *H04N 21/472* | (2011.01) |
| *H04N 19/40* | (2014.01) |
| *H04N 21/45* | (2011.01) |
| *H04N 21/488* | (2011.01) |
| *H04N 21/854* | (2011.01) |
| *H04N 21/2343* | (2011.01) |
| *H04N 21/845* | (2011.01) |
| *H04N 21/431* | (2011.01) |

(52) U.S. Cl.
CPC ......... *H04N 21/4722* (2013.01); *H04N 19/40* (2014.11); *H04N 19/51* (2014.11); *H04N 21/234309* (2013.01); *H04N 21/4316* (2013.01); *H04N 21/44016* (2013.01); *H04N 21/458* (2013.01); *H04N 21/4532* (2013.01); *H04N 21/47205* (2013.01); *H04N 21/4882* (2013.01); *H04N 21/8456* (2013.01); *H04N 21/854* (2013.01)

(58) Field of Classification Search
CPC .................................................. H04N 21/4722
See application file for complete search history.

(56) References Cited

U.S. PATENT DOCUMENTS

| | | |
|---|---|---|
| 8,752,113 B1 | 6/2014 | Good et al. |
| 10,231,033 B1 | 3/2019 | Bumgarner et al. |

(Continued)

OTHER PUBLICATIONS

U.S. Appl. No. 16/168,858 office action dated Nov. 20, 2019.

(Continued)

*Primary Examiner* — Michael H Hong
(74) *Attorney, Agent, or Firm* — Kligler & Associates Patent Attorneys Ltd (57) ABSTRACT

A method of providing a video program with overlay content. The method includes receiving a video program and transcoding the received video program into a plurality of segments, by the processor, each segment representing a different period of the video program. In response to receiving an instruction to add overlay content to the video program, a subset of the segments of the video program to which the overlay content is to be added is selected. Overlay content is added to the selected segments and the segments of the video program to which overlay content was added, together with the segments of the video program that were not selected are transmitted to a receiver.

38 Claims, 2 Drawing Sheets

(56) References Cited

U.S. PATENT DOCUMENTS

| | | |
|---|---|---|
| 10,460,357 B1 | 10/2019 | Bevacqua et al. |
| 2002/0178278 A1 | 11/2002 | Ducharme |
| 2002/0196370 A1* | 12/2002 | Dagtas ................. H04N 19/467 |
| | | 348/600 |
| 2009/0328096 A1 | 12/2009 | Krause et al. |
| 2011/0107363 A1* | 5/2011 | Sanghavi ........... G06Q 30/0224 |
| | | 725/23 |
| 2011/0145856 A1 | 6/2011 | Agarwal et al. |
| 2011/0321084 A1* | 12/2011 | Takahashi .......... H04N 5/23293 |
| | | 725/32 |
| 2012/0110619 A1 | 5/2012 | Kilar et al. |
| 2014/0359656 A1* | 12/2014 | Banica ................. H04N 21/234 |
| | | 725/32 |
| 2015/0067514 A1* | 3/2015 | Lewis ................... G06F 3/0482 |
| | | 715/720 |
| 2015/0135212 A1 | 5/2015 | Smolic et al. |
| 2016/0134677 A1 | 5/2016 | Mueller et al. |
| 2017/0195744 A1* | 7/2017 | Engel ................. H04N 21/4825 |
| 2018/0192106 A1* | 7/2018 | Loheide ........... H04N 21/26258 |

OTHER PUBLICATIONS

Boreczky et al., "Comparison of video shot boundary detection techniques", Journal of Electronic Imaging, vol. 5, issue 2, pp. 122-128, Apr. 1996.

Gutman et al., U.S. Appl. No. 16/168,858 filed Oct. 24, 2018.

\* cited by examiner

FIG. 1

FIG. 2

SELECTIVE VIDEO OVERLAY

RELATED APPLICATIONS

The present application claims the benefit of U.S. provisional patent application 62/563,932, filed Sep. 27, 2017, the disclosure of which is incorporated herein by reference in its entirety.

TECHNICAL FIELD

The present invention relates to communication systems and in particular to systems for processing video signals.

BACKGROUND

Graphic overlays on video images of television broadcast channels provide ancillary information to the video, such as promotional and branding information. Some information, such as the channel logo and the program name, typically don't change every time the program is being broadcast on a specific channel. However, some of the promotional information, such as information about new releases or "what's playing next" are likely to change every time the program is aired. Generally, overlay graphics are generally placed on only a small percentage of the video images, typically less than 5% of the program duration, so as not to overcrowd the video.

Known-in-the-art playout servers operate in real-time. They decode, overlay the graphic information and re-encode the entire program every time the program is transmitted.

U.S. Patent Publication 2002/0178278 to Ducharme, describes receiving a plurality of channels, decoding all of them, inserting graphic overlays on some of the channels as required and re-encoding the channels.

U.S. Pat. No. 8,752,113 to Good describes insertion of graphic overlays after a transcoder scale down function for achieving better video quality.

Another method for inserting graphic overlays is by sending the overlay content separately to a client device, as described by Smolic, U.S. Patent Publication No. 2015/0135212. Although this method eliminates the need to insert the ever-changing promotional overlays, it relics on advanced client devices to do the job and on non-standard distribution protocols.

SUMMARY

There is provided in accordance with an embodiment of the present invention, a method of providing a video program with overlay content, comprising receiving a video program, by a processor, transcoding the received video program into a plurality of segments, by the processor, each segment representing a different period of the video program, receiving an instruction to add overlay content to the video program, responsive to the received instruction, selecting a subset of the segments of the video program to which the overlay content is to be added, adding the overlay content to the selected segments, and transmitting the segments of the video program to which overlay content was added, together with the segments of the video program that were not selected to a receiver.

In some embodiments, the overlay content comprises advertisements. Optionally, adding the overlay content to the selected segments comprises decoding the selected segments, adding the overlay content and re-encoding the selected segments with the added overlay content. Optionally, adding the overlay content is performed in real time, within less than five minutes from receiving the video program. Optionally, receiving the video program comprises receiving a file including the video program and wherein transcoding the received video program into a plurality of segments is performed at least an hour before adding the overlay content.

Optionally, transcoding the received video program comprises identifying by the processor beginning and ending points of the video program in a continuous video stream and transcoding the received video program in a manner which takes the identified beginning and ending points into account. Optionally, transcoding the received video program comprises transcoding the content of each time period of the video program into a plurality of segments which differ in their encoding formats. Optionally, selecting the subset of the segments comprises selecting segments of a specific encoding format. Optionally, selecting the subset of the segments comprises selecting automatically based on pre-configured rules. Optionally, adding the overlay content is performed by a processor which handles segments of a plurality of video programs in parallel.

Optionally, receiving the instruction to add overlay content comprises receiving indication of a plurality of overlay content items and selecting a subset of the items, and wherein adding the overlay content comprises adding only the items in the selected subset. Optionally, selecting the subset of the items comprises selecting the subset of the items responsively to current information on the users to view the video program with the overlay content. Optionally, selecting the subset of the items comprises selecting the subset of the items responsively to current information on the users to view the video program with the overlay content.

Optionally, selecting the subset of the segments comprises selecting a number of segments to which overlay content is added. Optionally, selecting the number of segments comprises selecting responsively to a current load on a segment video processor adding the overlay content. Optionally, selecting the number of segments comprises selecting responsively to information on the viewers to receive the video program. Optionally, selecting the number of segments responsively to information on the viewers to receive the video program comprises selecting based on real time information on subscribers currently scheduled to receive the video program at the time of the adding of the overlay content to the selected segments.

Optionally, selecting the number of segments responsively to information on the viewers to receive the video program comprises selecting based on historical viewership information. Optionally, selecting the subset of the segments comprises selecting frames to which the overlay content is added, based on video and/or audio content of the frames. Optionally, selecting the subset of the segments comprises selecting segments responsive to the sizes of the segments. Optionally, adding the overlay content to the selected segments comprises creating a plurality of different versions of the video program with segments including overlay content and wherein transmitting the segments of the video program comprises selecting one of the different versions of the video program and transmitting the segments of the selected version.

There is further provided in accordance with an embodiment of the invention, a multimedia playout system, comprising a transcoder configured to transcode video programs into a plurality of segments, including one or more segments for each of a plurality of periods covering the video program, a selector configured to select a subset of the segments of the video program to which overlay content is to be added, responsive to receiving an instruction to add overlay content to the video program, a segment video processor configured to add overlay content to the selected segments and a transmitter which transmits the segments of the video program to which overlay content was added, together with the segments of the video program that were not selected, to a receiver.

Optionally, the segment video processor is configured to add overlay content to segments of a plurality of video programs concurrently. Optionally, the selector is configured to select a number of segments of a video program to which overlay content is to be added, responsively to a current load on the segment video processor. Optionally, the selector is configured to select segments of a video program to which overlay content is to be added, responsively to an estimation of demographics of viewers of the video program.

There is further provided in accordance with an embodiment of the invention, a method of adding overlay content to a video program, including receiving a video program, by a processor, selecting frames to which the overlay content should be added, responsively to analysis of content of the video program and adding overlay content to the selected frames. Optionally, selecting the frames to which the overlay content should be added comprises selecting responsively to motional complexity of the video program in the vicinity of the frames. Optionally, selecting the frames to which the overlay content should be added comprises selecting responsively to spatial complexity of the frames. Optionally, selecting the frames to which the overlay content should be added comprises selecting responsively to audio content of the video program in the vicinity of the frames.

Optionally, the method includes receiving indication of a plurality of items of overlay content, and selecting a subset of the items of overlay content. The adding of overlay content optionally includes adding only the items of overlay content in the selected subset. Optionally, selecting the subset of the items of overlay content comprises selecting responsive to content of the video program. Optionally, selecting frames to which the overlay content should be added comprises evaluating multiple areas of each of a plurality of frames of the video program, and selecting frames including areas evaluated as most suitable for receiving overlay content. Optionally, selecting frames including areas evaluated as most suitable for receiving overlay content comprises selecting areas as a function of their proximity to a lower part of the frame and responsive to their spatial complexity.

Optionally, selecting frames to which the overlay content should be added comprises selecting at least partially responsive to proximity of the frames to a break in the video program.

These and other embodiments will be more fully understood from the following detailed description of the embodiments thereof, taken together with the drawings in which:

DETAILED DESCRIPTION OF EMBODIMENTS

Overview

An aspect of some embodiments of the present invention relates to apparatus and methods for video distribution, which perform segmentation of received video streams before adding overlay content. The segmentation of the video stream before adding overlay content allows adding the overlay content only to the specific segments to which the overlay content is to be added, and thus reduces the required processing power.

Optionally, video playout is performed after the adding of overlay content, and therefore after segmentation. In some embodiments, performing video playout after segmentation limits the playout to intra-segment operations. This limitation is considered to be worthwhile in view of the gain from the limited complexity of the overlay insertion.

System Description

Figure 1:
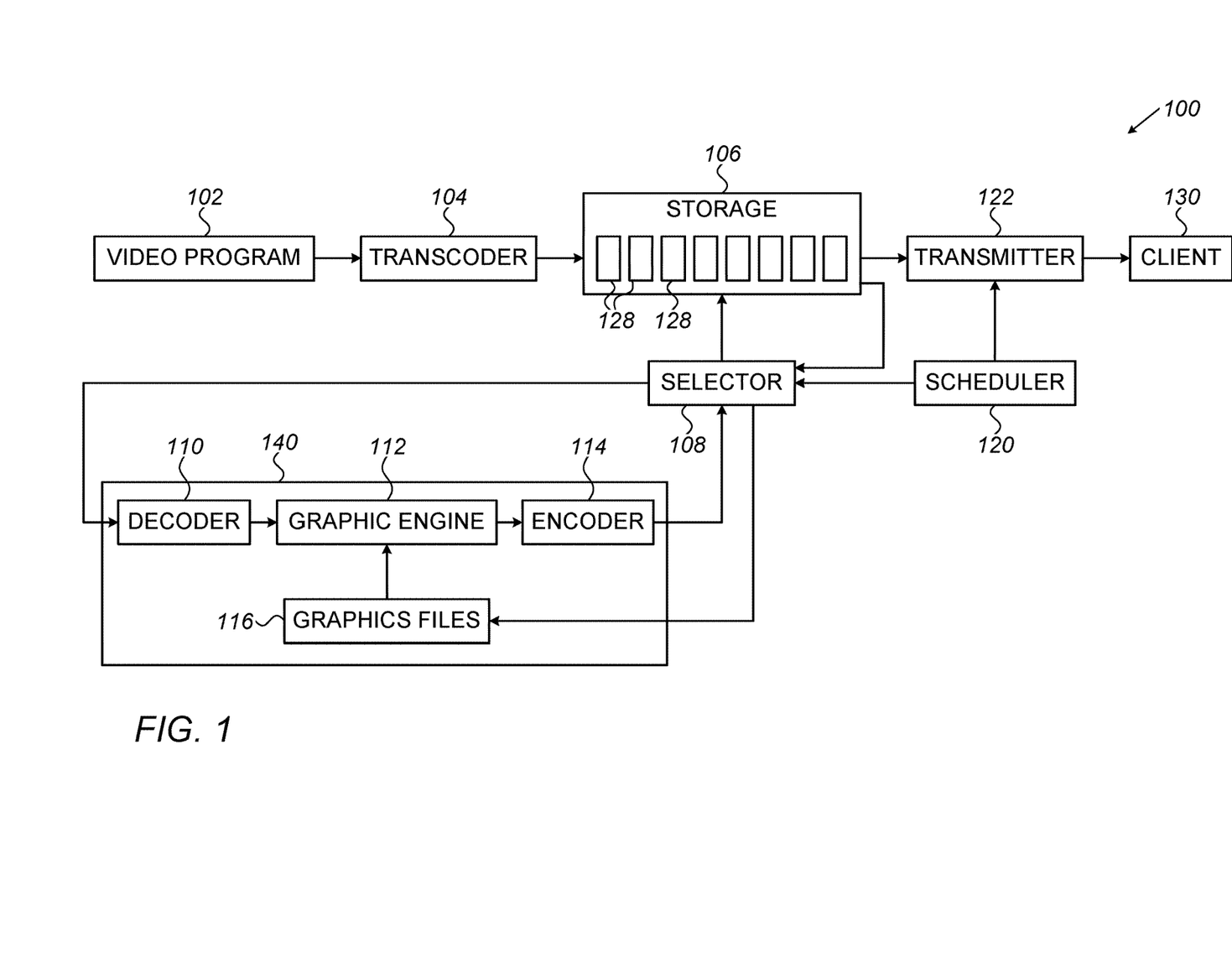
FIG. 1 is a schematic illustration of a segment-based graphic overlay system, in accordance with an embodiment of the invention.

FIG. 1 is a schematic illustration of a segment based graphic overlay system 100, in accordance with an exemplary embodiment of the invention. System 100 comprises a transcoder 104, which receives video programs, illustrated in FIG. 1 by a video program 102, transcodes the received video programs 102 into segments 128 and stores the segments in a memory 106. A selector 108 receives instructions from a scheduler 120 on overlay content that is to be added to specific video programs, and selects the specific segments of the program to which the overlay content is added.

System 100 further comprises a segment video processor 140 which adds the overlay content to the selected segments. Segment video processor 140 comprises a decoder 110, which decodes the segments to which overlay content, is to be added, a graphic engine 112 which adds overlay content to the decoded segments, and an encoder 114, which re-encodes the segments after the overlay content was added. The re-encoded segments with the overlay content are optionally returned to memory 106, from where they are supplied with the remaining segments of their programs to which overlay content was not added, to a transmitter 122, for transmission to clients 130. The clients 130 may be any device configured to display or handle video programs in the format of the programs, such as an origin or edge server or an end-user set-top box or video viewing device.

In some embodiments, segment video processor 140 comprises one or more programmable processors capable of executing software for carrying out the functions of decoder 110, graphic engine 112 and encoder 114. The software may be downloaded to the one or more processors in electronic form, over a network, for example, or it may, alternatively or additionally, be provided and/or stored on non-transitory tangible media, such as magnetic, optical, or electronic memory. Alternatively or additionally, segment video processor 140 comprises dedicated hardware and/or firmware which carry out some or all of the tasks of segment video processor 140. The tasks of decoder 110, graphic engine 112 and encoder 114 may be carried out together by one or more processors. In other embodiments, each of decoder 110, graphic engine 112 and encoder 114 is implemented by a different separate processor.

In accordance with an exemplary embodiment of the invention, decoder 110, graphic Engine 112 and/or encoder 114 reside remotely, in a data center or in a cloud facility, optionally operated by a 3rd party, possibly as a service.

Figure 2:
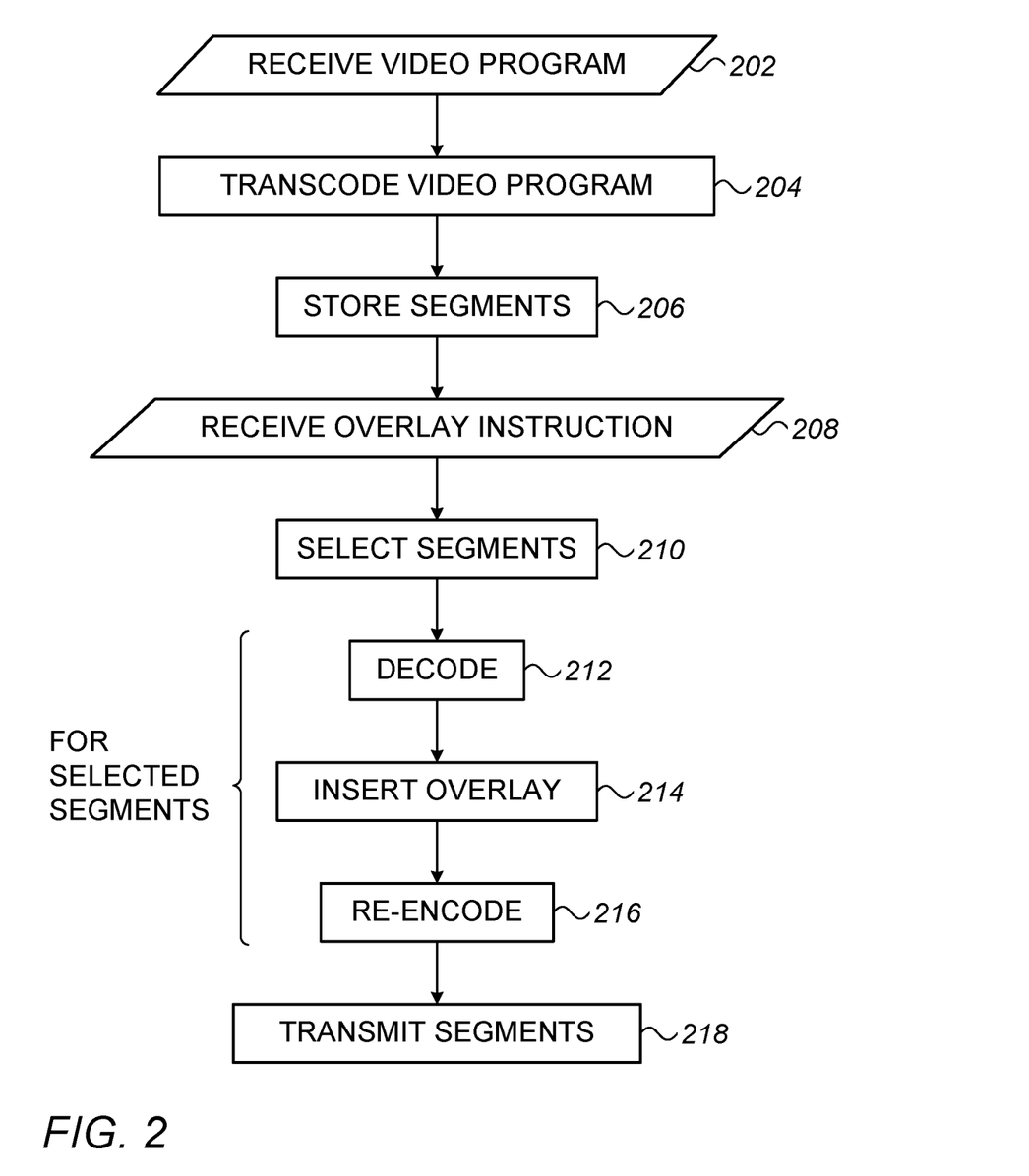
FIG. 2 is a flowchart of a method of adding overlay content to a video program, in accordance with an embodiment of the invention.

FIG. 2 is a flowchart of acts performed by system 100 in handling a received video program, in accordance with an embodiment of the invention. Upon receiving (202) a video program, the program is transcoded (204) into a plurality of separate segments, which are stored (206) in memory 106.

In response to receiving (208) an instruction to overlay content on a program, selector 108 selects (210) a subset of the segments of the program to which the content is to be overlaid. The selected segments are decoded (212), processed to insert (214) overlay content by graphic engine 112 and re-encoded (216) by encoder 114. Depending on the received (208) instruction, the re-encoded selected segments are stored back into memory 106 and/or are transmitted (218) with the unchanged non-selected segments of the video program to client 130.

The transcoding (204) may be carried out in advance or in real time. For real time transmissions, the received program is preferably in the form of a live stream. The storage in memory 106 for real time transmissions is generally performed for short term buffering, for a duration of less than 15 minutes, less than a minute or even less than 10 seconds or less than a second. For segmentation in advance, the program is optionally received in one or more files. The storage in memory 106 in these embodiments may be for long term storage from which the segments are retrieved on demand. The segments are stored in memory 106, in some embodiments, for longer than an hour, longer than a day or even longer than a year. In some embodiments, transcoder 104 handles both real-time and non-real-time tasks, concurrently and/or intermittently.

Referring in more detail to the transcoding (204), the transcoding is optionally performed using any suitable method known in the art, such as any of the methods described in US patent publication 2010/0008421 to Gutman et al., titled: "distributed transcoding", and/or in US patent publication 2016/0134677 to Mueller et al., titled: "Apparatus and Method for Cloud Assisted Adaptive Streaming", which are incorporated herein by reference in their entirety.

Optionally, in transcoding (204) video streams, transcoder 304 identifies program boundaries between programs, and in generating the segments avoids inclusion of content from two different programs in a single segment. The program boundaries are identified based on in-band signalling, out of band signalling, an electronic program guide (EPG) provided with the video program, and/or by auto-detection. In some embodiments, the boundaries are received by transcoder 104 through an input human-interface through which a human user indicates suggested boundaries.

The auto-detection of boundaries is optionally performed using any suitable method known in the art, such as any of the methods described in "Comparison of Video Shot Boundary Detection Techniques" to Boreczky, Journal of Electronic Imaging, April 1996, which is incorporated herein by reference in its entirety. In some embodiments, the auto-detection is based on detection of the channel ID video at the beginning of the program and credits at the end of the program.

In some embodiments, transcoder 104 searches for advertisements in the video program and removes them from the program or handles them separately from the program. The boundaries of the advertisements are optionally identified using any of the methods discussed above regarding identification of program boundaries.

In some embodiments, the segments are relatively small, optionally including less than 20 frames, less than 5 frames or even only a single frame. Alternatively, the segments are relatively large and include at least one group of pictures (GOP) or at least three GOPs. In some embodiments, the segments have a display duration of at least half a second, at least a second or even at least 10 seconds. The segments may all represent video segments of the same duration, or different segments may have different duration.

Each time duration of the video program is optionally transcoded into a single segment having a desired bit-rate, frame rate and resolution. Alternatively, some or all of the segments are transcoded into a plurality of blocks of different sizes, having different bit rates, frame rates and/or resolutions. The segments are optionally encoded in containers of one or more formats known in the art, such as .mp4, .flv, and/or .ts. The segments are optionally prepared for transmission in accordance with one or more transmission formats, such as and not limited to HTTP live streaming (HLS), smooth streaming and/or MPEG dynamic adaptive streaming over HTTP (Dash).

In some embodiments, the transcoding (204) includes generating a playlist file referred to herein as a manifest file. The manifest file provides pointers to the segments forming the video program in the order of intended display, for example as is known in the art for the HLS or DASH formats.

Relating further to storing (206) the segments. In some embodiments the storage duration is determined in accordance with a distribution window contract or a manual configuration. Memory 106 comprises a suitable memory unit for video storage such as a DRAM, SSD, SATA drive, NAS/SAN or cloud storage. Memory 106 may be based on local, remote and/or distributed storage.

As to receiving (208) the instruction, in some embodiments, the instruction is an instruction to transmit the video program to a client with overlay content. In other embodiments, the instruction is not linked to transmission of the video program but rather prepares the video program with overlay content, for transmission at a later time.

The overlay content is generally provided by a human, user and may include notices of release of new programming content, a marketing campaign, or any other desired content. In some embodiments, the overlay content comprises advertisements.

Optionally, the specific advertisements to be added as overlay content are selected from a set of available advertisements, based on an estimation of demographics of the viewers. The estimation of the demographics or the viewers may be carried out in advance, for example when the transcoding (204) is performed, or may be carried out in real time by selector 108. When estimated in advance, the viewer demographics are optionally estimated based on historical viewership information of the video program in previous screenings thereof, or of similar video programs. When the estimation of the demographics of the viewers is carried out in real time, the estimation alternatively or additionally depends on current information on the current subscribers requesting to view the video program.

As to selection (210) of the segments to undergo overlay, in accordance with an exemplary embodiment of the invention, the selection of segments is done manually by programming personnel. In other embodiments, the selection of segments is performed automatically based on rule based heuristics, depending on various parameters, such as and not limited to, time of day, time points relative to the beginning of a program and/or return from a commercial break and program duration. The segment selection depends in some embodiments on the type of content being overlaid. For some content, types it may be desirable to provide the overlay at the beginning of a program, while other overlay content types may be best provided in the middle or the end of the program.

Any percentage of segments of a program may undergo overlay. In some embodiments more than 50% or even more than 90% of the segments undergo overlay. Particular gain from the present invention, however, arises in cases in which less than 20%, less than 10%, less than 5% or even less than 1% of the segments undergo overlay.

The number of segments to be selected for a specific video program is optionally fixed, for example as a percentage of the number of segments of the program. The percentage is optionally a fixed value lower than 10% or even lower than 5%. Alternatively, the number of segments is determined automatically in response to the current load level of segment video processor 140 and/or to a cost function charged by segment video processor 140 for performing the overlay. In some embodiments, the number of segments is determined automatically in response to information on the viewers to receive the content, for example their sensitivity to advertisements.

Optionally, for each video program and/or for each type of overlay content, a set of one or more rules defining the number of selected segments as a function of the current conditions, are provided. The rules are optionally defined in advance by a human user and evaluated in real time when an instruction to add overlay content is received (208). For example, a rule may indicate the number of segments to receive overlay content as a function of the specific type of overlay content and/or the specific type of the video program.

In some embodiments, the segments, the specific frames, and/or the locations within the frames to receive the overlay content are selected at least partially based on their video and/or audio content. For example, it may be desirable to provide overlay content at durations in which the video program is not rapidly changing and/or at times in which the audio level is relatively quiet. Alternatively or additionally, the segments for overlay are selected as ones with small size or a size which is efficiently completed to a desired delivery size by the overlay content.

In some embodiments, the segments, frames and/or locations within the frames to receive overlay content are selected as locations with low spatial and/or motional complexity. Optionally, an overlay compatibility score is assigned to each frame, group of pictures and/or segment. The score is optionally a weighted sum of an amount of spatial/motional complexity, a minimal duration of low spatial/motional complexity under a pre-defined threshold, and/or a distance in seconds from a commercial break. In some embodiments, scores are assigned to sub-areas within the frames. The score of each sub-area optionally depends on the spatial and/or motional complexity of the sub-area and the location of the sub-area in the frame. For example, higher suitability for overlay is assigned to sub-areas closer to the bottom of the frame and/or to the lower third of the frame. Possibly, the location dependent portion of the score depends on proximity to a corner of the frame.

The selection (210) of segments is optionally performed automatically or manually, once per program, to mark the segments that are to undergo overlay addition. Optionally, the segment selection is carried out for each video program, by selector 108, the first time that overlay is performed for the video program. Selector 108 stores the segment selection in memory 106, or in a different storage unit, for reuse in subsequent times when the video program is requested.

Alternatively, the selection (210) or the segments and/or the frames to receive the overlay content is performed by transcoder 104 when the segments are generated. The results of the selection are stored together with the segments and used by selector 108 in selecting the frames that are passed to segment video processor 140 for adding the overlay content. In some embodiments, transcoder 104 selects the segments to receive overlay content for some video programs while for other video programs the selection is performed by selector 108. Alternatively or additionally, transcoder 108 selects only a sub-portion of the segments and leaves to selector 108 to select the remaining segments depending on the conditions at the time of providing the video program to the client.

Further alternatively, the selection (210) is performed every time a program is requested, for example when the selection of the segments depends on the attributes of the client requesting the video program and/or on the quality of the transmission link to the client.

In some embodiments of the invention, selector 108 converts the segments to different formats before sending them to decoder 110. Selector 108 optionally passes the segments to decoder 110 using a suitable transmission protocol, such as HTTP live streaming (PLS), TS/UDP/IP, real time messaging protocol (RTMP), MPEG-TS over ASI, uncompressed IP, uncompressed SDI, file transfer protocol (ftp), media RSS (MRSS) and/or fast and secure protocol (FASP) of Aspera. Selector 108, according to some possible embodiments of the invention in which transcoder 104 prepares multiple segment blocks of different size and, or quality, passes to decoder 110 the segment block with the highest resolution and/or bit rate. Alternatively, the segment block that is passed to decoder 110 is selected based on current channel conditions and/or the current bit rate to be supplied to the client. In some embodiments, selector 108 determines and/or is configured with expected processing times of segments by segment video processor 140, for segments of different resolution, frame rate and/or bit rate. Accordingly, selector 108 selects the segment blocks to undergo overlay at lease partially according to the current load on segment, video processor 140. Optionally, when segment video processor 140 is loaded, blocks with an encoding which provides for a fastest overlay are selected.

In some embodiments of the invention, selector 106 selects segments from a plurality of video programs and queues them to decoder 110, or a plurality of decoders, for handling in parallel (i.e., segments of first and second programs are handled intermittently, such that the segments of the second program are handled both before and after segments of the first program). The distribution of the segments between the decoders is optionally performed based on a round robin algorithm or a minimum-server-usage algorithm, not using an additional server before all used servers are in full capacity.

If for each channel, up to 10% of the segments undergo overlay addition, segment video processor 140 operating at real time can handle at least 10 channels concurrently.

Referring in detail to the insertion (214) of the overlay content, in some embodiments of the invention, scheduler 120 provides a list of graphic files 116 including the overlay content to be added to the selected segments of the video programs. The graphic files 116 are optionally stored in memory 106, or in a separate storage system, such as an internal memory unit within segment video processor 140. The graphic files 116 can include, for example, images, logos, set of images, 3D graphics, and/or moving animation, with alpha blending and motion. The overlay may cover a large portion of the area of frames of the program, possibly more than 50% of the total area, or may cover only a small percentage of the area of the frames of the program, such as less than 10% or less than 5% of the area of the frames. In some embodiments, the overlay content is added to a lower part of the frame, for example a lower third or a lower quarter of the frame.

Encoder 114 optionally re-encodes (216) the outcome overlaid segments with a similar encoding to the segments before the decoding (212) and to the non-selected segments stored in memory 106, in terms of bit rate, frame rate and resolution.

In some embodiments, the re-encoded (216) segments are stored back into memory 106. In other embodiments, the re-encoded segments are passed directly to transmitter 122. Optionally, in these other embodiments, packets not selected (210) for overlay are provided directly to transmitter 122, while packets to undergo overlay are passed to segment video processor 140 for real time overlay. After overlay, the re-encoded segments are provided directly to transmitter 122.

In accordance with an embodiment of the invention, selector 108 receives segments with the added overlay from encoder 114 and writes them back to memory 106. Selector 108 can also convert the received segments back to their format before they were passed to segment video processor 140 and/or to match the format of the previously stored segments as needed. In other embodiments, the storage back to memory 106 is performed without involvement of selector 108.

After the re-encoding (216) of segments of a video program, the manifest of the video program is optionally updated to change the pointers to the re-encoded segments. Optionally, pointers in the manifest to the non-selected segments are not changed. Therefore, during repeated delivery of the video program in a downstream content distribution network (CDN), even if the overlay content is different, many of the segments are unchanged. These unchanged segments may be already cached in the CDN, in a manner improving the cache efficiency of the CDN.

In some embodiments of the invention, transmitter 122 passes the video programs with the segments having overlaid content to clients 130. Transmitter 122 may convert the segment files to a different format, such as and not limited to RTMP, TS/UDP/IP or an mp4 container delivered in MRSS feed. In some embodiments, transmitter 122 receives information on the distribution configuration and timing of the updated overlaid video program from scheduler 120, through an API. Optionally, transmitter 122 transmits a list of program and interstitials such that it produces a linear TV channel. In some embodiments, in transmission of a video program, transmitter 122 receives a manifest of the video program, which indicates the segments of the program, collects the segments indicated in the manifest and forwards them to the client 130. Transmitter 122 optionally performs playout tasks to the transmitted video programs, in order to fit the video program to the transmission channel. Generally, the playout is limited to each segment separately and transmitter 122 does not perform inter-segment playout reencoding.

Transmitter 122, according to some possible aspects of the invention, streams the same channel in different distribution formats to different destinations. Alternatively or additionally, transmitter 122 transmits the same program on different playlists and multiple channels at the same time.

As discussed above, in some embodiments the same video program is transmitted repeatedly at different times with different overlay content. Memory 106 permanently stores the segments without the overlay content and adds the overlay content immediately before transmitting the video program. The segments with the overlay content are stored temporarily in memory 106 for the duration of the transmission. In other embodiments, different versions of a video program with different overlay content optimized for different clients are stored concurrently in memory 106. For example, different versions of the video program are generated with overlay content optimized for different viewership demographics. The different versions may have different overlay content added to the same segments or may have same or different overlay content added to different subsets of segments independently selected. At the time of transmission of the video program, a version determined to have viewership demographics closest to the current real-time viewership requesting the video program is selected for transmission.

Optionally, a different manifest is generated for each version of the video program. The versions share some of the segments which do not include overlay or include the same overlay content, while the versions differ in the segments that have different overlay content (including cases in which the segment for one version has overlay content and for the other version does not have overlay content). Thus, the costs of generating the plurality of versions is relatively low in processing power consumed for adding the overlay and in storage space required for storing the segments that differ.

It will thus be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of providing a video program with overlay content, comprising:
receiving a video program, by a processor of a multimedia playout system;
transcoding the received video program into a plurality of segments in one or more video transmission formats for distribution over a downstream content distribution network (CDN), by the processor, each segment representing a different period of the video program;
receiving an instruction to add overlay content to the video program;
responsive to the received instruction, automatically selecting, by the processor, a subset of the segments of the video program to which the overlay content is to be added;
adding the overlay content to the selected segments and not to the non-selected segments, by the processor; and
transmitting the segments of the video program to which overlay content was added, together with the segments of the video program that were not selected to a receiver over the downstream content distribution network (CDN), wherein the transmission is performed without inter-segment playout reencoding, wherein selecting the subset of the segments comprises selecting less than 20% of the segments, such that the overlay content is added to less than 20% of the segments.

2. The method of claim 1, wherein adding the overlay content to the selected segments comprises adding advertisements.

3. The method of claim 1, wherein adding the overlay content is performed in real time, within less than five minutes from receiving the video program.

4. The method of claim 1, wherein receiving the video program comprises receiving a file including the video program and wherein transcoding the received video program into a plurality of segments is performed at least an hour before adding the overlay content.

5. The method of claim 1, wherein transcoding the received video program comprises identifying by the processor beginning and ending points of the video program in a continuous video stream and transcoding the received video program in a manner which takes the identified beginning and ending points into account.

6. The method of claim 1, wherein transcoding the received video program comprises transcoding the content of each time period of the video program into a plurality of segments which differ in their encoding formats.

7. The method of claim 1, wherein selecting the subset of the segments comprises selecting automatically based on preconfigured rules.

8. The method of claim 1, wherein adding the overlay content is performed by a processor which handles segments of a plurality of video programs in parallel.

9. The method of claim 1, wherein receiving the instruction to add overlay content comprises receiving indication of a plurality of overlay content items and selecting a subset of the items, and wherein adding the overlay content comprises adding only the items in the selected subset.

10. The method of claim 1, wherein selecting the subset of the segments comprises selecting a number of segments to which overlay content is added.

11. The method of claim 1, wherein selecting the subset of the segments comprises selecting frames to which the overlay content is added, based on the video and/or audio content of the frames.

12. The method of claim 1, wherein selecting the subset of the segments comprises selecting segments responsive to the sizes of the segments.

13. The method of claim 1, wherein adding the overlay content to the selected segments comprises creating a plurality of different versions of the video program with segments including overlay content and wherein transmitting the segments of the video program comprises selecting one of the different versions of the video program and transmitting the segments of the selected version.

14. The method of claim 1, wherein adding the overlay content to the selected segments comprises decoding the selected segments, adding the overlay content and re-encoding the selected segments with the added overlay content.

15. The method of claim 1, wherein transcoding the received video program into a plurality of segments comprises segmenting into segments of a size of less than 20 frames.

16. The method of claim 1, wherein the segments are in accordance with the HTTP live streaming (HLS) format.

17. The method of claim 6, wherein selecting the subset of the segments comprises selecting segments of a specific encoding format.

18. The method of claim 9, wherein selecting the subset of the items comprises selecting the subset of the items responsively to current information on the users to view the video program with the overlay content.

19. The method of claim 9, wherein selecting the subset of the items comprises selecting the subset of the items responsively to current information on the users to view the video program with the overlay content.

20. The method of claim 10, wherein selecting the number of segments comprises selecting responsively to a current load on a segment video processor adding the overlay content.

21. The method of claim 10, wherein selecting the number of segments comprises selecting responsively to information on the viewers to receive the video program.

22. The method of claim 21, wherein selecting the number of segments responsively to information on the viewers to receive the video program comprises selecting based on real time information on subscribers currently scheduled to receive the video program at the time of the adding of the overlay content to the selected segments.

23. The method of claim 21, wherein selecting the number of segments responsively to information on the viewers to receive the video program comprises selecting based on historical viewership information.

24. A multimedia playout system, comprising:
a transcoder configured to transcode video programs into a plurality of segments in one or more video transmission formats for distribution over a downstream content distribution network (CDN), including one or more segments for each of a plurality of periods covering the video program;
a selector configured to automatically select a subset of the segments of the video program to which overlay content is to be added, responsive to receiving an instruction to add overlay content to the video program;
a segment video processor configured to add overlay content to the selected segments and not to the non-selected segments; and
a transmitter which transmits the segments of the video program to which overlay content was added, together with the segments of the video program that were not selected, to a receiver over the downstream content distribution network (CDN), wherein the transmission is performed without inter-segment playout reencoding,
wherein the selector is configured to select a number of segments of a video program to which overlay content is to be added, responsively to a current load on the segment video processor.

25. The system of claim 24, wherein the segment video processor is configured to add overlay content to segments of a plurality of video programs concurrently.

26. The system of claim 24, wherein the selector is configured to select segments of a video program to which overlay content is to be added, responsively to an estimation of demographics of viewers of the video program.

27. A method of providing a video program with overlay content, comprising:
receiving a video program, by a processor of a multimedia playout system;
transcoding the received video program into a plurality of segments in one or more video transmission formats for distribution over a downstream content distribution network (CDN), by the processor, each segment representing a different period of the video program;

receiving an instruction to add overlay content to the video program;

responsive to the received instruction, automatically selecting, by the processor, a subset of the segments of the video program to which the overlay content is to be added;

adding the overlay content to the selected segments and not to the non-selected segments, by the processor; and transmitting the segments of the video program to which overlay content was added, together with the segments of the video program that were not selected to a receiver over the downstream content distribution network (CDN), wherein the transmission is performed without inter-segment playout reencoding, wherein selecting the subset of the segments comprises selecting a number of segments to which overlay content is added, and wherein selecting the number of segments comprises selecting responsively to a current load on a segment video processor adding the overlay content.

28. The method of claim 27, wherein selecting the subset of the segments comprises selecting less than 20% of the segments, such that the overlay content is added to less than 20% of the segments.

29. A method of providing a video program with overlay content, comprising:

receiving a video program, by a processor of a multimedia playout system;

transcoding the received video program into a plurality of segments in one or more video transmission formats for distribution over a downstream content distribution network (CDN), by the processor, each segment representing a different period of the video program;

receiving an instruction to add overlay content to the video program;

responsive to the received instruction, automatically selecting, by the processor, a subset of the segments of the video program to which the overlay content is to be added;

adding the overlay content to the selected segments and not to the non-selected segments, by the processor; and transmitting the segments of the video program to which overlay content was added, together with the segments of the video program that were not selected to a receiver over the downstream content distribution network (CDN), wherein the transmission is performed without inter-segment playout reencoding, wherein transcoding the received video program into a plurality of segments comprises segmenting into segments of a size of less than 20 frames.

30. The method of claim 29, wherein adding the overlay content is performed in real time, within less than five minutes from receiving the video program.

31. The method of claim 29, wherein receiving the video program comprises receiving a file including the video program and wherein transcoding the received video program into a plurality of segments is performed at least an hour before adding the overlay content.

32. The method of claim 29, wherein selecting the subset of the segments comprises selecting a number of segments to which overlay content is added.

33. The method of claim 9, wherein selecting the subset of the segments comprises selecting segments responsive to the sizes of the segments.

34. The method of claim 29, wherein adding the overlay content to the selected segments comprises creating a plurality of different versions of the video program with segments including overlay content and wherein transmitting the segments of the video program comprises selecting one of the different versions of the video program and transmitting the segments of the selected version.

35. The method of claim 29, wherein adding the overlay content to the selected segments comprises decoding the selected segments, adding the overlay content and re-encoding the selected segments with the added overlay content.

36. The method of claim 32, wherein selecting the number of segments comprises selecting responsively to information on the viewers to receive the video program.

37. The method of claim 36, wherein selecting the number of segments responsively to information on the viewers to receive the video program comprises selecting based on real time information on subscribers currently scheduled to receive the video program at the time of the adding of the overlay content to the selected segments.

38. The method of claim 36, wherein selecting the number of segments responsively to information on the viewers to receive the video program comprises selecting based on historical viewership information.

\* \* \* \* \*